United States Patent
Lee

(10) Patent No.: US 8,555,622 B2
(45) Date of Patent: Oct. 15, 2013

(54) EXHAUST GAS POST PROCESSING SYSTEM

(75) Inventor: Sangmin Lee, Yongin (KR)

(73) Assignee: Hyundai Motor Company, Seoul (KR)

( * ) Notice: Subject to any disclaimer, the term of this patent is extended or adjusted under 35 U.S.C. 154(b) by 190 days.

(21) Appl. No.: 13/169,884

(22) Filed: Jun. 27, 2011

(65) Prior Publication Data

US 2012/0144810 A1    Jun. 14, 2012

(30) Foreign Application Priority Data

Dec. 9, 2010    (KR) .................. 10-2010-0125527

(51) Int. Cl.
*F01N 3/00*    (2006.01)
*F01N 3/02*    (2006.01)
*F01N 5/02*    (2006.01)

(52) U.S. Cl.
USPC .............................................. 60/298; 60/320

(58) Field of Classification Search
USPC ............................................ 60/320, 321, 298
See application file for complete search history.

(56) References Cited

U.S. PATENT DOCUMENTS

| | | | |
|---|---|---|---|
| 3,105,708 A * | 10/1963 | Esty | 285/41 |
| 3,747,346 A * | 7/1973 | Onoda et al. | 60/286 |
| 5,201,802 A * | 4/1993 | Hirota et al. | 60/276 |
| 5,549,872 A * | 8/1996 | Hosoya et al. | 422/173 |
| 5,753,188 A * | 5/1998 | Shimoda et al. | 422/108 |
| 6,178,744 B1 * | 1/2001 | Perset | 60/288 |
| 6,422,007 B1 * | 7/2002 | Hartick | 60/298 |
| 2009/0277165 A1 * | 11/2009 | Geskes et al. | 60/320 |
| 2009/0308059 A1 * | 12/2009 | Ikemoto | 60/287 |
| 2010/0146943 A1 * | 6/2010 | Muramatsu et al. | 60/286 |

FOREIGN PATENT DOCUMENTS

| | | | |
|---|---|---|---|
| JP | 59157491 A | * | 9/1984 |
| JP | 10-196353 A | | 7/1998 |
| JP | 2010-71216 A | | 4/2010 |
| JP | 2010-90851 A | | 4/2010 |
| KR | 10-2010-0039278 A | | 4/2010 |

* cited by examiner

*Primary Examiner* — Thomas Denion
*Assistant Examiner* — Mickey France
(74) *Attorney, Agent, or Firm* — Morgan, Lewis & Bockius LLP

(57) ABSTRACT

An exhaust gas post processing system may include an exhaust pipe in which an exhaust gas from an engine passes, a catalyst that may be disposed at the exhaust pipe so as to decrease a harmful material of the exhaust gas, and a water jacket that may be formed around an exhaust pipe that may be disposed at an upstream side of the catalyst of the exhaust pipe, wherein a coolant may be selectively supplied into the water jacket such that the water jacket cools down the exhaust gas passing the exhaust pipe and thus the catalyst does not be over heated.

6 Claims, 3 Drawing Sheets

EXHAUST GAS POST PROCESSING SYSTEM

CROSS-REFERENCE TO RELATED APPLICATION

The present application claims priority to Korean Patent Application No. 10-2010-0125527 filed in the Korean Intellectual Property Office on Dec. 9, 2010, the entire contents of which is incorporated herein for all purposes by this reference.

BACKGROUND OF THE INVENTION

1. Field of the Invention

The present invention relates to an exhaust gas post processing system that raises the temperature of the exhaust gas at an early stage of the engine operating and prevents the temperature of the exhaust gas from being excessively raised.

2. Description of Related Art

Generally, so as to purify the exhaust gas of the diesel vehicle, a diesel oxidation catalyst (DOC) and a diesel particulate filter (Diesel particulate filter) are applied and the DOC oxidizes a carbon monoxide and a hydrocarbon to eliminate them.

Further, the diesel particulate filter traps particulate matters of the exhaust gas, if the trapped PM exceeds a predetermined value, a fuel is post injected, the temperature of the exhaust gas is raised by the fuel oxidation heat in the DOC, and the trapped PM is burned in the diesel particulate filter.

Meanwhile, there is a problem that the exhaust gas purification catalyst (DOC, DPF, LNT, HC-SCR, and so on) is not activated from a low temperature of the exhaust gas in a condition that the engine is in an early stage of the operating. In addition, there is a problem that the catalyst is over heated by the exhaust gas passing the catalyst.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exhaust gas post processing system having advantages of quickly raising the temperature of the catalyst at an early stage of the engine operating so as to activate the catalyst and cooling the exhaust gas when the temperature of the exhaust gas is raised to the high temperature so as to protect the catalyst from the high temperature.

An exhaust gas post processing system, may include an exhaust pipe in which an exhaust gas from an engine passes, a catalyst that may be disposed at the exhaust pipe so as to decrease a harmful material of the exhaust gas, and a water jacket that may be formed around an exhaust pipe that may be disposed at an upstream side of the catalyst of the exhaust pipe, wherein a coolant may be selectively supplied into the water jacket such that the water jacket cools down the exhaust gas passing the exhaust pipe and thus the catalyst does not be over heated.

A supply line supplies the coolant to the water jacket of the exhaust pipe at an upstream side of the catalyst and a return line exhausts the coolant from the water jacket.

A supply control valve and a return control valve may be disposed at the supply line and the return line respectively so as to control the flow of the coolant.

The supply line may be fluid-connected to an upper portion of the water jacket and the return line may be fluid-connected to a lower portion of the water jacket.

A control portion selectively closes the supply control valve and the return control valve according to a temperature of he exhaust gas.

The control portion closes the supply control valve and opens the return control valve when the temperature of the exhaust gas may be lower than a predetermined value at an early stage of the engine operating such that the coolant within the water jacket may be exhausted.

The control portion opens the supply control valve and the return control valve such that the coolant circulating the water jacket cools down the exhaust gas when the temperature of the exhaust gas passing the catalyst may be higher than a predetermined value after the engine may be warmed up.

The exhaust pipe may have a double pipe structure in which an inner pipe may be inserted into an outer pipe and the water jacket may be formed between the outer pipe and the inner pipe.

As stated above, in the exhaust gas post processing system according to the present invention, the coolant that flow the exhaust pipe prevents the temperature of the exhaust gas from being over heated such that the catalyst is not deteriorated beforehand. Further, the coolant is exhausted from the water jacket around the exhaust pipe at an early stage of the engine operating to achieve the heat insulation effect such that the temperature of the exhaust gas is quickly raised.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
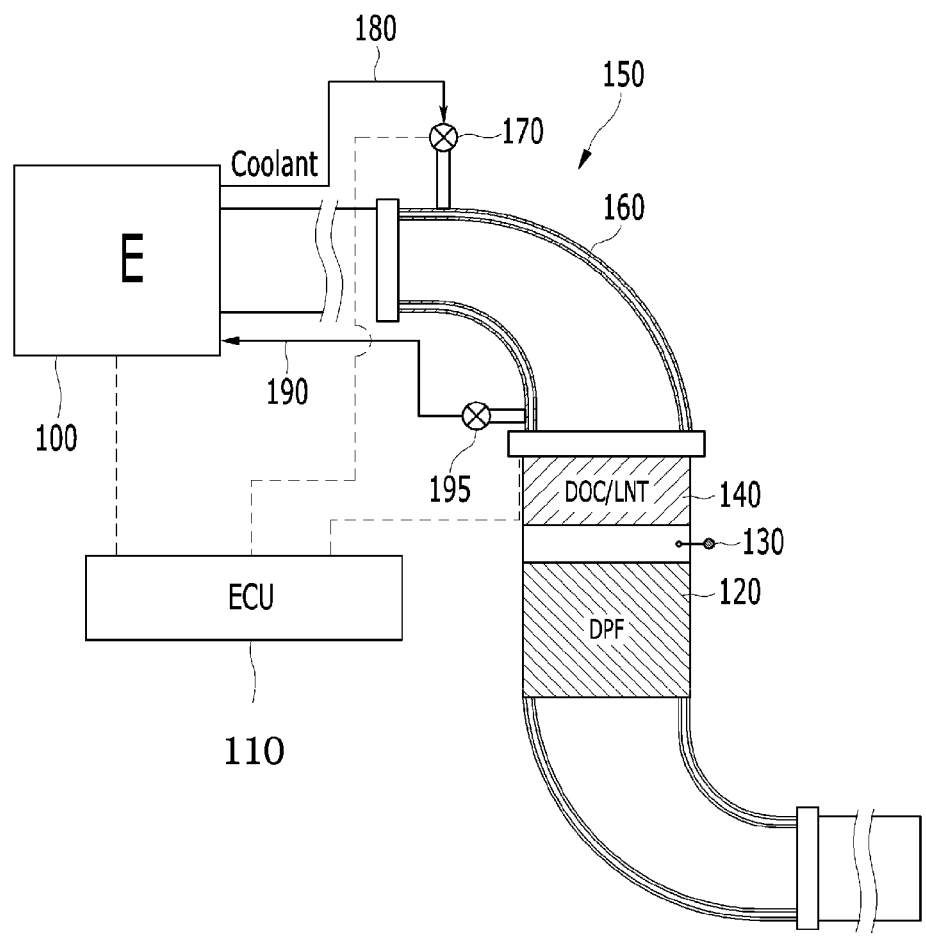
FIG. 1 is a schematic diagram of an exhaust gas post processing system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of an exhaust gas post processing system according to an exemplary embodiment of the present invention.

Referring to FIG. 1, an exhaust gas post processing system includes an engine 100, a control portion 110, an exhaust pipe 150, a diesel particulate filter 120, a temperature sensor 130, a diesel oxidation catalyst 140, a coolant supply line 180, a supply line valve 170, a coolant return line 190, and a return line valve 195. Further, a water jacket 160 is formed along an outside surface of the exhaust pipe 150.

The exhaust pipe 150 has a double pipe type and the water jacket 160 is formed between the exterior circumference of one pipe and the interior circumference of another pipe. The diesel oxidation catalyst 140 and the diesel particulate filter 120 are sequentially disposed at a downstream side of the water jacket 160.

As shown, the water jacket 160 is formed at an upstream side of the diesel oxidation catalyst 140 and this is one of exemplary embodiments, and the water jacket 160 can be formed at any portion of the exhaust line.

The coolant supply line 180 supplies the coolant to an upper side of the water jacket 160 and the coolant return line 190 receives the coolant from a lower portion of the water jacket 160.

The supply line valve 170 is disposed at a portion of the coolant supply line 180 through which the coolant is supplied and the return line valve is disposed at a portion of the coolant return line 190 through which the coolant is withdrawn.

The temperature sensor 130 detects the temperature of the exhaust gas flowing the exhaust pipe 150 and transfers the detected temperature signal to the control portion 110.

100321 The control portion 110 controls an opening rate of the supply line valve 170 and the return line valve 195 according to a temperature signal transferred from the temperature sensor 130 and an operating condition of the engine 100.

For example, if the control portion 110 opens the supply line valve 170 and the return line valve 195, the coolant is supplied through the coolant supply line 180 and the supply line valve 170, and the coolant is exhausted through the return line valve 195 and the coolant return line 190.

Further, if the control portion closes the supply line valve 170 and opens the return line valve 195, the coolant in the water jacket 160 is exhausted through the return line valve 195 by the weight of oneself.

As shown, because the coolant return line 190 is connected to a lower end portion of the water jacket 160 and the coolant supply line 180 is connected to an upper end portion of the water jacket 160, if the supply line valve 170 is closed and the return line valve 195 is opened, the water jacket 160 is drained by its own weight and the air fills the water jacket 160.

Figure 2:
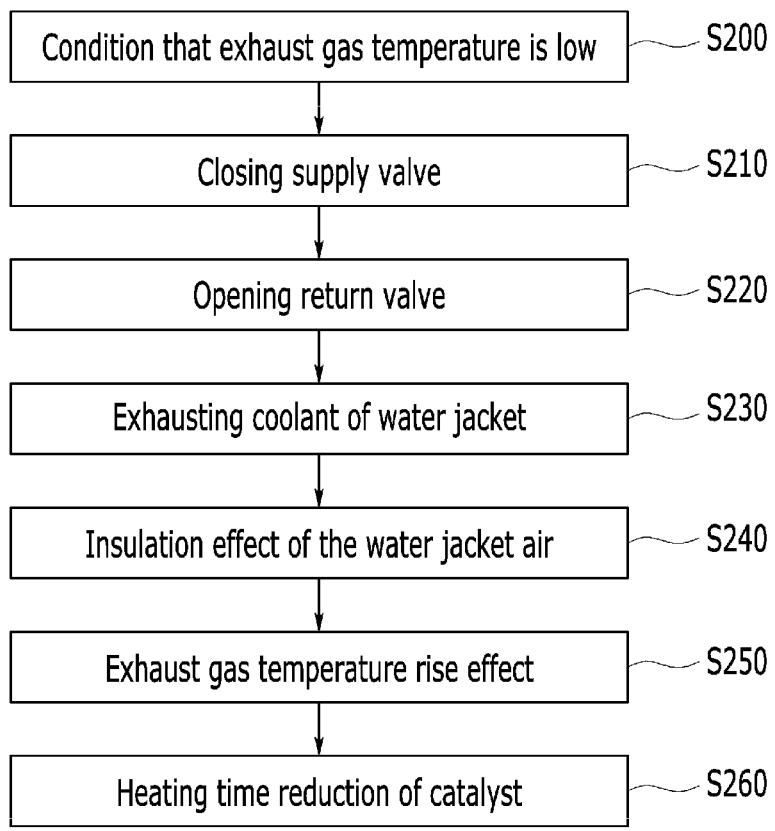
FIG. 2 is a control flowchart for a low temperature of an exhaust gas in an exhaust gas post processing system according to an exemplary embodiment of the present invention.

FIG. 2 is a control flowchart for a low temperature of an exhaust gas in an exhaust gas post processing system according to an exemplary embodiment of the present invention.

Referring to FIG. 2, the control portion 110 determines whether the temperature of the exhaust gas is lower than a predetermined value or not through the temperature sensor 130 in a S200.

The control portion 110 closes the supply line valve 170 in a S210 and the control portion 110 opens the return line valve 195 in a S220. Accordingly, the coolant is exhausted from the water jacket 160 through the coolant return line 190 in a S230 such that the air within the water jacket 160 achieves the insulation effect in a S240, the temperature of the exhaust gas is quickly raised in a S250, and the heating period for activating the catalyst (DOC, DPF) is reduced in a S260.

Figure 3:
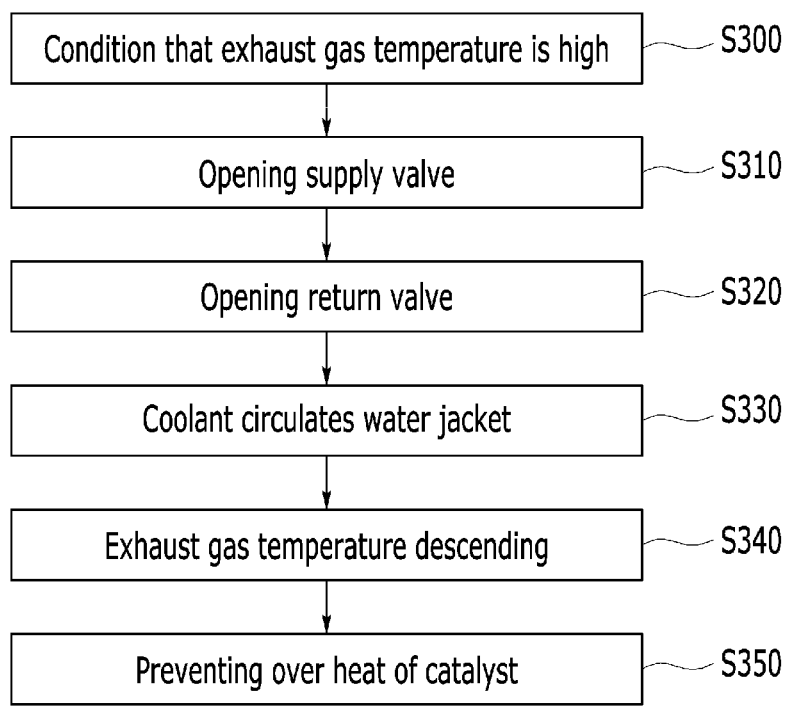
FIG. 3 is a control flowchart for a high temperature of an exhaust gas in an exhaust gas post processing system according to an exemplary embodiment of the present invention.

FIG. 3 is a control flowchart for a high temperature of an exhaust gas in an exhaust gas post processing system according to an exemplary embodiment of the present invention.

Referring to FIG. 3, the control portion determines whether the temperature of the exhaust gas is larger than a predetermined value through the temperature sensor 130 in a S300.

If the temperature value is larger than that, the control portion 110 opens the supply line valve 170 in a S310, and the control portion 110 opens the return line valve 195 in a S320.

Accordingly, the coolant circulates the coolant supply line 180, the water jacket 160, and the coolant return line 190 in a S230, the temperature of the exhaust gas descends by the coolant circulating the water jacket 160 in a S340, and it is prevented that the catalyst (DOC, DPF) is over-heated in a S350.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust gas post processing system, comprising:
an exhaust pipe in which an exhaust gas from an engine passes;
a catalyst that is disposed at the exhaust pipe so as to decrease a harmful material of the exhaust gas; and
a water jacket that is formed around the exhaust pipe and is disposed at an upstream side of the catalyst;
a supply line fluid-connected to an upper portion of the water jacket for supplying a coolant to the water jacket;
a return line fluid-connected to a lower portion of the water jacket for exhausting the coolant; and
a supply control valve and a return control valve disposed at the supply line and the return line respectively to control a flow of the coolant to or from the water jacket,
wherein the coolant in the water jacket is drained by its own weight when the supply line valve is closed and the return line is opened, and air fills the water jacket to achieve an insulation effect such that a heating period for activating the catalyst is reduced.

2. The exhaust gas post processing system of claim 1 further comprising a control portion that selectively opens/closes the supply control valve and the return control valve according to a temperature of the exhaust gas.

3. The exhaust gas post processing system of claim 2, wherein the control portion closes the supply control valve and opens the return control valve when the temperature of the exhaust gas is lower than a predetermined value at an early stage of the engine operating such that the coolant within the water jacket is exhausted.

4. The exhaust gas post processing system of claim 2, wherein the control portion opens the supply control valve and the return control valve such that the coolant circulating the water jacket cools down the exhaust gas when the temperature of the exhaust gas passing the catalyst is higher than a predetermined value after the engine is warmed up.

5. The exhaust gas post processing system of claim 1, wherein the exhaust pipe has a double pipe structure in which an inner pipe is inserted into an outer pipe and the water jacket is formed between the outer pipe and the inner pipe.

6. The exhaust gas post processing system of claim 1, wherein the coolant circulates through the supply line, the water jacket and the return line when the supply line valve and the return line are opened, and cools the exhaust gas to prevent the catalyst from being overheated.

* * * * *